UNITED STATES PATENT OFFICE.

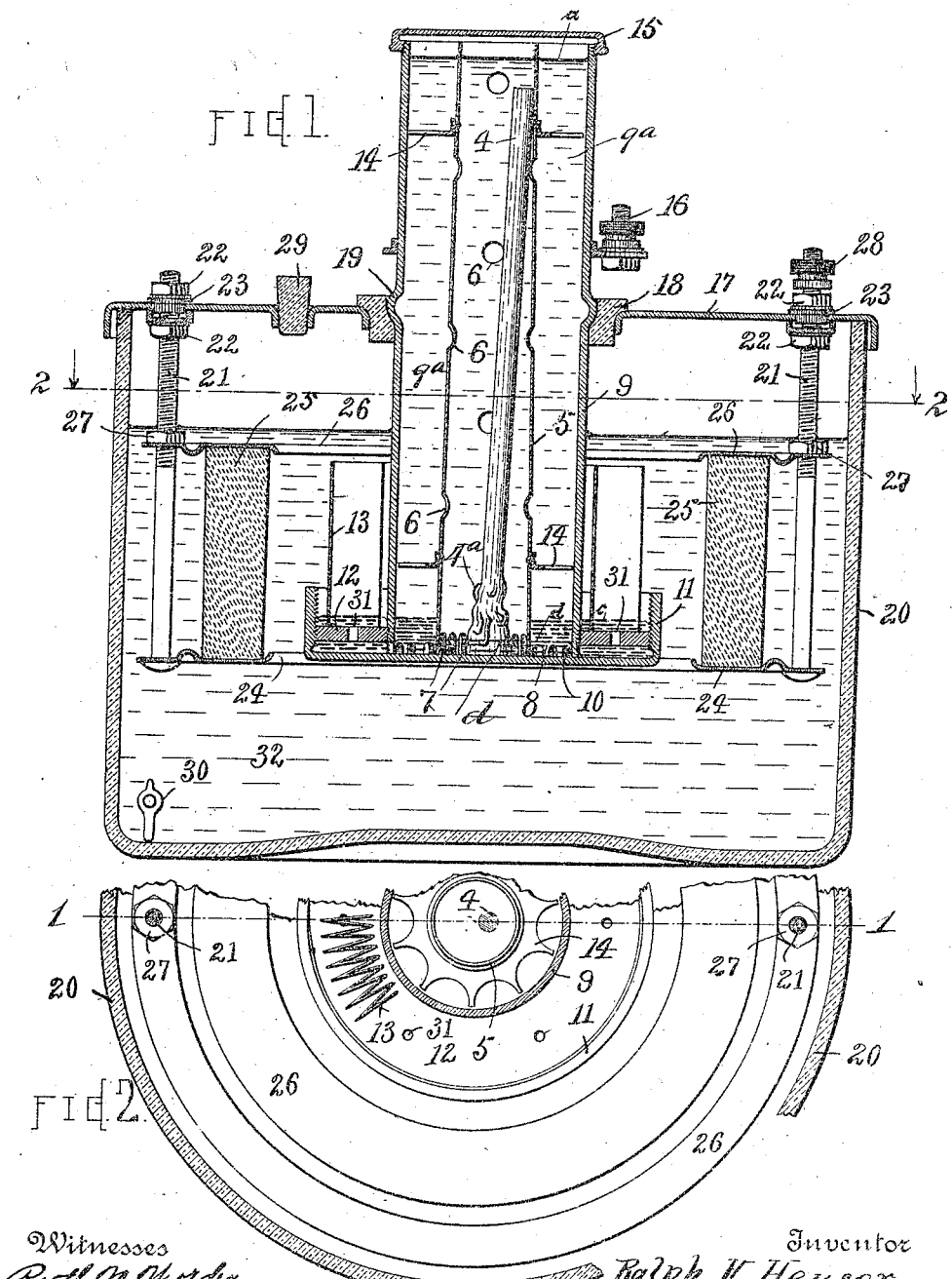

RALPH V. HEUSER, OF WATERBURY, CONNECTICUT, ASSIGNOR TO THE ROESSLER & HASSLACHER CHEMICAL CO., OF PERTH AMBOY, NEW JERSEY, A CORPORATION OF NEW YORK.

PRIMARY BATTERY.

1,015,734.   Specification of Letters Patent.   Patented Jan. 23, 1912.

Application filed September 10, 1910. Serial No. 581,439.

*To all whom it may concern:*

Be it known that I, RALPH V. HEUSER, a citizen of Switzerland, and resident of Waterbury, in the county of New Haven and State of Connecticut, have invented certain new and useful Improvements in Primary Batteries, of which the following is a specification.

My invention relates to new and useful improvements in primary batteries, and particularly to that class of cell known as the De Lalande battery. This type of battery usually comprises an anode consisting of amalgamated zinc, a cathode consisting of copper oxid and a solution of caustic soda or potash in water as an electrolyte, whereas I use in my improved cell metallic sodium in connection with copper oxid or copper peroxid or combination of the two and a caustic soda solution.

It is the object of my invention to secure a high electromotive force available at the poles of the cell, and to produce the caustic soda spontaneously at the expense of the sodium as it is consumed when the cell is in operation; to employ the sodium in a convenient form so that it can be easily replaced from time to time as occasion may require; to produce a battery which will be cheap to operate in comparison with the work performed, and further to produce a cell the used cathodes of which will not be impregnated with zinc compounds. In this cell not only the sodium is renewed when consumed but also part of the electrolyte is replaced, by means of an equal volume of pure water, in which manner the electrolyte can be maintained indefinitely.

With these and other objects in view the invention consists in the construction and novel combination and arrangement of parts hereinafter fully described, illustrated in the accompanying drawings, and pointed out in the claims hereto appended, it being understood that various changes in the form, proportion, size, and minor details of construction within the scope of the claims may be resorted to without departing from the spirit or sacrificing any of the advantages of the invention, for instance the relative position of the electrodes may be reversed.

Similar characters of reference denote like or corresponding parts throughout the several figures of the accompanying drawings forming a part of this specification, and upon which—

Figure 1, shows a central vertical cross sectional view through my improved form of battery, and Fig. 2, is a sectional plan of the cell, partly broken away, and taken on line 2—2 of Fig. 1.

Throughout this specification I refer, for the sake of clearness, to metallic sodium, alloys of same and sodium hydroxid, but desire it to be understood that also other elements and compounds may be used which belong into the groups of alkali metals or compounds of same.

Since metallic sodium is decomposed by water and aqueous solutions of caustic soda it cannot be brought directly into contact with an electrolyte. If, however, metallic sodium is alloyed with other metals, for instance zinc, lead or especially mercury, it is possible to check the action of a moderately strong solution of hydroxid upon it, to such an extent that the consumption of sodium is retarded during idle periods of the battery. Improved results are obtained with batteries of this sort by first allowing the mercury to unite with the sodium, the amalgam thus formed would then be brought into contact with the electrolyte and after the sodium has been discharged, the mercury is returned into the amalgamation chamber fit for another cycle of operation. In this way a comparatively small quantity of mercury is required to bring into action large amounts of sodium and the expenses of operating a cell of this kind are only governed by the consumption of sodium and the exchange of the cathodes for new ones. If it should, however, be attempted to unite the sodium with the mercury in the usual manner, that is by submerging clean pieces of sodium in a mercury bath, the violence of the reaction would be so great that the whole apparatus would be liable to destruction. It is therefore an essential part of my invention to render this process of amalgamation entirely safe and practicable.

Referring in detail to the characters of reference marked upon the drawings 4 represents a stick of metal sodium arranged within the battery as in operation. This sodium stick may be produced by forcing the plastic metal through a die and then cutting up the rod thus obtained into suitable lengths. The surface of the lower end portion of the rod is further cut (as shown at 4ª) to insure a prompt action thereon of the fluid surrounding the same.

5 represents a tube of copper or other metal of proper length and provided with holes 6 in its wall. The bottom end of the tube is also provided with a series of holes or openings 7 through which communication is had for a thin layer of mercury 8 from the tube 5 into the lower end of a surrounding cylindrical vessel 9 formed of glass, porcelain or metal (as used in present instance). This vessel is also provided with openings 10 in its lower end to allow the mercury 8 to pass in from the outer cup 11. The outer portion of the cup is covered by a perforated disk 12 that is threaded on its outer edge to engage the inner threaded wall of the cup and threaded on the inner wall to be engaged by the threaded end portion of the vessel 9 before mentioned. This cup thus forms a bottom and support for the several connected parts and likewise to receive and contain the mercury. A corrugated cylinder 13 made of thin sheet copper is placed on the cap 12 and serves as an addition to the positive electrode surface by reason of a retention of the mercury which is uplifted when cell is in operation. As for instance my experiments show that an amalgamated sheet of metal in contact with the solution of metallic sodium in mercury acts like the mercury itself. In other words it affords a means to extend the effective mercury surface in a vertical direction in which manner the opposite electrodes can be more closely approached and thereby the internal resistance diminished. The tube 5 is held in place within the vessel 9 by being supported on the bottom of the cup, 11 in part and further by reason of the braces 14—14 secured thereto and intermediate thereof and the surrounding vessel 9. Both the tube 5 and vessel 9 are inclosed at the top ends by a cover 15 which is preferably threadably attached. A binding post 16 is secured to the side of the vessel 9 for the attachment of a feed wire not shown. The tube vessel, cup, and corrugated cylinder are thus united and constitute one pole of the battery and are insulatively supported from the cover 17 by a porcelain collar 18 through which the cylindrical vessel extends and against which an annular rib 19 of said vessel rests as shown in Fig. 1. The cover 17 further serves to inclose the battery jar 20 and to support the opposite or negative pole of the battery. The vessel 9 and the tube 5 are filled with hydrocarbon 9ª to compress the mercury in the bottom of vessel and cup and force a portion thereof up and out through the holes 31 in a manner to cover the disk 12 to the level $c$ where it contacts with the electrolyte contained within the jar.

The negative pole of the battery is supported from the outer portions of the cover 20 of the jar through the medium of hanger rods 21—21 which are insulatively secured to the said cover by suitable porcelain washers and nuts 22 and 23 respectively. An annular sheet metal plate 24 is punched, and placed against the head on lower end of rods 21 for the purpose of supporting a cylindrical oxid of copper electrode 25. A similar plate 26 is arranged upon the upper part of the rods and is clamped down upon the negative electrode by nuts 27 threadably attached to the said rods 21 for the attachment of a second field wire, not shown.

A removable rubber stopper 29 serves to close a filling hole in cover 17, by means of which part of the solution may be pipetted out and exchanged for water as occasion requires.

30 is a float preferably made of stained glass by blowing, having such a ratio of weight to volume that it begins to rise as soon as the density of the liquid displaced attains a certain density, normally the float will be seen at the bottom of the jar.

In practice the battery would be charged as follows:—The vessel 9 together with the inner tube, cover, and negative element are lifted out of the jar, and dry pure mercury is then poured into the cup 11 until it covers the holes 31 in disk. The vessel and tube 5 are next filled to the level $a$ as shown, from their top, with hydrocarbon in a manner to cause the mercury in bottom to rise, to level $c$. The cover with its attached parts is then set in place in the jar and the electrodes submerged in the caustic soda solution 32, causing the mercury in the cylindrical vessel to become depressed and forced downwardly in the outer part of cup to the lower lever $d$, Fig. 1. The stick of sodium 4 may next be placed in the tube as shown, whereupon amalgamation will set up immediately and sodium amalgam formed which having a density considerably smaller than mercury, will rise to the outer and highest level occupied by the mercury level $c$. This will cause a steady flow of amalgam to penetrate the holes 31 and come in contact with the electrolyte 32, thus causing the cell to attain its working potential.

Having thus described my invention what I claim and desire to secure by Letters Patent is—

1. In a battery, a supporting structure for an electrode comprising a perforated copper tube and a vessel in which the tube is contained, the vessel having openings therein through which mercury may be introduced, sodium within said tube, a filling of mercury and oil within the said vessel and tube and a complementary electrode.

2. In a battery the combination of a negative electrode with a vessel, of a cup forming a bottom therefor, a perforated disk for covering the outer part of the cup surrounding the vessel, a tube within the vessel and provided with openings therethrough, a piece of sodium within the tube and forming the positive electrode, and a filling of mercury within the vessel tube and cup.

3. The combination with a jar and cover, of suspending rods attached to the cover, upper and lower annular plates attached to the rods, a cylindrical electrode intermediate the said plates, and a positive element comprising sodium and mercury, suitable vessels for containing the sodium and mercury, which are submerged within a proper electrolyte.

4. In a battery the combination with a negative element of a vertically disposed perforated copper tube, a stick of sodium contained therein, the sodium forming the positive electrode, a cylindrical vessel surrounding the tube, a cup attached to the end of the vessel and forming a bottom for the same and tube, a filling of mercury and oil within the tube, vessel and cup, and means for supporting said parts within a battery jar.

5. A battery electrode comprising an elongated piece of sodium, in combination with a vertically disposed copper tube for supporting the sodium upon its end, a vessel in which the tube and sodium are contained and having openings therein through which mercury is introduced to the vessel and tube, and a filling of mercury within the said vessel and tube.

6. In a battery the combination of a negative electrode with a vessel, of a cup forming a bottom for the end thereof, a perforated disk for covering the outer part of the cup surrounding the vessel, a tube within the vessel and provided with openings therethrough, a piece of sodium within the tube and forming the positive electrode, a filling of mercury within the vessel, tube and cup, a corrugated sheet of copper also supported upon the cup and surrounding the vessel.

7. The combination with a jar and cover of suspending rods attached to the cover, upper and lower annular plates attached to the rods, a cylindrical negative electrode intermediate the said plates, and a positive element formed of sodium and mercury, a vessel within the cylindrical electrode for containing the sodium and an electrolyte in which the said parts are submerged.

8. In a battery the combination with a cylindrical negative element, of a supporting structure for a positive element within the negative element and comprising a perforated copper tube, a stick of sodium contained therein, a cylindrical vessel inclosing the tube, a cover for tube and vessel, a mercury chamber surrounding the vessel and tube and communicating therewith, a filling of mercury within the chamber, vessel and tube, and means for supporting said parts within a battery jar.

9. In a battery the combination with a negative electrode of a vessel supported within a battery jar cover, an annular perforated disk attached to the lower end portion of the vessel, a cup supported and inclosed by the disk, a metal tube within the vessel and supported by the cup and having perforations therethrough, sodium within the tube and forming the positive electrode, and mercury and oil surrounding the sodium.

10. In a battery the combination with a negative electrode of a vessel supported within a battery jar cover and extended above and below the same, a perforated tube within the vessel and spaced from the side walls thereof, a cup surrounding the vessel and communicating with the same and tube, a filling of mercury within the tube, vessel and cup and sodium and forming the positive electrode contained within the said parts.

11. In a battery the combination with a jar and cover and an electrolyte contained therein, of a cylindrical vessel insulatively supported within a hole of the cover, a perforated tube within the vessel, sodium within the tube and forming the positive electrode, mercury within the tube and vessel, a copper sheet surrounding the vessel and supported thereby, and a negative electrode surrounding the said vessel and parts contained therein and also submerged within the electrolyte.

12. In a battery the combination with a negative electrode of a positive electrode, an electrolyte surrounding the same, a perforated vessel within the electrolyte and containing the positive electrode, a filling of hydrocarbon within the vessel, and a layer of mercury contacting with said positive electrode intermediate the hydrocarbon and electrolyte.

Signed at Waterbury in the county of New Haven and State of Connecticut this 6th day of September A. D., 1910.

RALPH V. HEUSER.

Witnesses:
W. C. CLAYTON,
J. R. CLAYTON.